United States Patent [19]

Layton

[11] Patent Number: 5,011,262
[45] Date of Patent: Apr. 30, 1991

[54] FIBER OPTIC SENSOR ARRAY

[75] Inventor: Michael R. Layton, Clayton, Calif.

[73] Assignee: Litton Systems, Inc., Beverly Hills, Calif.

[21] Appl. No.: 509,236

[22] Filed: Apr. 16, 1990

[51] Int. Cl.⁵ ............................ G02B 6/02; G02B 6/16
[52] U.S. Cl. .............................. 350/96.29; 350/96.16
[58] Field of Search .............. 350/96.29, 96.30, 96.15, 350/96.16

[56] References Cited

U.S. PATENT DOCUMENTS

| | | | |
|---|---|---|---|
| 4,859,019 | 8/1989 | Beran | 350/96.16 |
| 4,900,115 | 2/1990 | Heuring et al. | 350/96.16 |
| 4,923,267 | 5/1990 | Su | 350/96.16 |
| 4,934,777 | 6/1990 | Jou et al. | 350/96.16 |

Primary Examiner—William L. Sikes
Assistant Examiner—Robert E. Wise
Attorney, Agent, or Firm—Elliott N. Kramsky

[57] ABSTRACT

A fiber optic array for detecting and communicating the state of a plurality of spatically remote variables includes a plurality of switchable optical couplers. The couplers are located between fiber optic sense coils that cause responsive phase shifts in optical pulses launched through the array. The couplers are controlled by the parallel outputs of shift registers so that a coupler is only "on" for the period of time required to couple out a portion of the optical energy of a pulse after passage through the adjacent sense coil and is thereafter shut "off" to minimize crosstalk between the sensors and to optimize the output optical power.

7 Claims, 5 Drawing Sheets

FIBER OPTIC SENSOR ARRAY

BACKGROUND

1. Field of the Invention

The present invention relates to apparatus for remotely sensing variables substantially-simultaneously at a plurality of locations. More particularly, this invention pertains to a fiber optic sensor array architecture therefor.

2. Background of the Prior Art

Current methods for the remote sensing of variables such as acoustic pressure at multiple locations employ electronic means (piezoelectric transducers or "hydrophones", low-noise electronic preamplifiers and either analog or digital multiplexing). Such hardware is generally located within a waterproof, oil-filled hose that may be towed behind a ship.

Sensor arrays of the above-described type require close proximity between the preamplifier and the transducer. The preamplifiers, low-noise devices with high-input impedances, are prone to pick up extraneous signals. Furthermore, it is the present trend to utilize smaller diameter hoses which, of course, only exacerbates the pick-up problem. Conventional array designs locate the bulk of the electronic hardware within the system's "wet" end and therefore drive up the wet end cost. This is quite undesirable since the wet end of the system is subject to extreme mechanical and environmental stresses and, in fact, is often subject to damage or loss. Coaxial cable or twisted wire pairs, commonly employed in telemetry schemes, are subject to crosstalk when multiple lines are required (that is, for arrays containing large numbers of sensors) and especially when the lines must be packaged in small-diameter hoses.

Attempts have been made to perform substantially the same functions by means of fiber optic sensors and telemetry. Three such approaches have been investigated including (1) time-division multiplexed, (2) frequency-division multiplexed and (3) Fabry-Perot (recursive) designs. Each of such approaches is subject to significant shortcomings. Fabry-Perot sensor arrays (which employ partially-reflective splice joints) are subject to unacceptably high levels of crosstalk in certain significant applications. Time-division multiplexed recursive array architectures that employ lightly-tapped directional couplers also encounter crosstalk problems. Non-recursive sensor array architectures (either time or frequency division multiplexed) can achieve acceptable crosstalk levels but lack optical power efficiency due to the losses that occur at dead-end paths on the return fiber bus.

SUMMARY OF THE INVENTION

The present invention provides a fiber optic sensor array that is directed to the solution of many of the problems of the prior art. In accordance with the invention a continuous optical fiber is provided that is arranged into a sensor branch and a return bus. The sensor branch includes a plurality of distinct fiber sensing coils. A plurality of switchable directional couplers is arranged so that communication is provided between the bus and the sensor branch. Each coupler includes a pair of input ports and a pair of output ports. The sensor branch is arranged so that a segment thereof passes from an input port to an output port of each coupler. Similarly, the return bus is arranged so that a segment thereof also passes from an input port to an output port of each coupler. Means are provided for selectively switching each of the couplers between an "on" state and an "off" state whereby, in the "off" state, light is not coupled between the sensor branch and return bus segments. Means are also provided for applying an optical pulse to the optical fiber and for applying predetermined electrical signals to the couplers so that each is switched to the "on" state prior to arrival of the pulse and switched to the "off" state after transit of the pulse therethrough. Finally, means, engaged to the termination of the optical fiber adjacent the return bus, are provided for receiving and processing the optical output of the array.

The foregoing and additional features and advantages of the present invention will become further apparent from the detailed description that follows. This description is accompanied by a set of drawing figures. Numerals of the written description, corresponding to those of the drawings, point to the various features of the invention, like numerals referring to like features throughout both the written description and the drawings.

DETAILED DESCRIPTION

Figure 1:
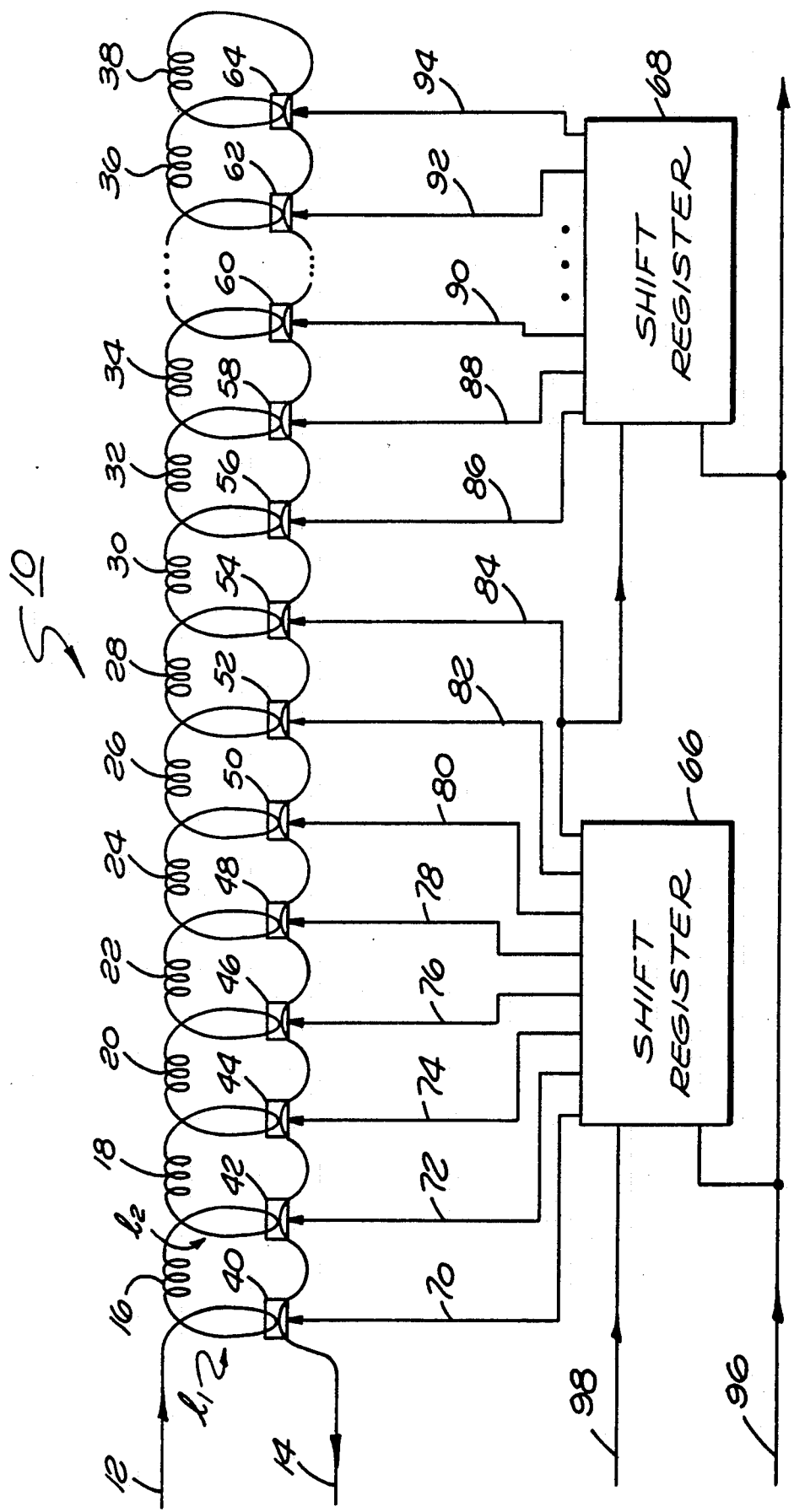
FIG. 1 is a schematic diagram of a fiber optic sensing array architecture in accordance with the invention.

Turning now to the drawings, FIG. 1 is a schematic diagram of a fiber optic sensing array 10 in accordance with the present invention. The invention employs optical fiber and fiber optic directional couplers exclusively for performing the sensing and telemetry functions of the system "wet end" (hydrophone application). By so doing, the electrical pick-up problem common to conventional piezoelectric approaches is avoided. Furthermore, the mechanical complexity of hose design is reduced, providing cost and reliability advantages. As will be seen, the invention attains low crosstalk and excellent optical power efficiency by employing switchable fiber optic directional couplers in the telemetry function. The power efficiency and low part count of Fabry-Perot designs are obtained simultaneously with the low crosstalk of certain nonrecursive array designs. Furthermore, as will be seen, the invention offers a high degree of operational flexibility through the use of switchable couplers that can reconfigure system operation through the simple and straightforward reprogramming of the addressing signals.

The structure illustrated in FIG. 1 is a hybrid architecture insofar as it utilizes both fiber optic and electronic components. Unlike conventional hybrid electrooptic sensing arrays, however, both the sensing and telemetry portions of the invention are entirely optical. Therefore, the sensed signal remains in optical form throughout the entire wet end (hydrophone application) of the system. Electrical power is employed solely for the purpose of switching optical pulses between fibers. The switchable directional couplers, discussed in detail below, are utilized to control the path of the light pulses.

The array 10 comprises a single continuous optical fiber that "begins" at an input end 12 and "terminates" at an output end 14, the ends 12 and 14 providing communication with a remote electrooptic system.

The continuous fiber array may be thought of as comprising two functionally distinct portions. An input fiber line or sensor branch includes a plurality of sense coils 16 through 38 that are designed for sensitivity to changes in the distributed field quantity to be measured such as acoustic pressure. A light pulse, upon passing through such a coil, experiences a linear change in the propagation time (or the optical phase) as a function of the acoustic pressure amplitude or other field quantity. A plurality of single "loops" (e.g. 11, 12, etc.), each of which provides a pair of optical fiber segment leads for a switched directional coupler, is located between each pair of sense coils and, as will be discussed, provides means for outputting the detected optical signals. The other portion of the continuous fiber array comprises a return bus that is illustrated parallel to and below the sensing branch. A plurality of segments of the return bus provides the other pairs of leads for each of the plurality of four-port switchable directional couplers 40 through 64.

Thus, proceeding through the continuous optical fiber from the input end 12, one proceeds through the above-described plurality of sense loops that comprise the sensing branch and the associated loop segments that are threaded through two of the four ports of each coupler to a return bus that includes a plurality of segments each of which is threaded through the remaining pair of ports of one of the couplers. As a consequence of the above-described directionality, the portion of a fiber segment adjacent the right hand side of a directional coupler communicates with an input port of the device while the segment immediately adjacent a left hand side of a coupler as shown in FIG. 1 communicates with an output port thereof.

As shown, 8-bit serial input/parallel output shift registers 66,68 communicate with and provide (electrical) control signals to the directional couplers through the illustrated conductors 70 through 94. A clocking signal is provided to the registers through the conductor 96 while a data line 98 permits the inputting of a bit (electrical signal) that is clocked through the registers 66 and 68 in accordance with the timing diagram illustrated in FIG. 3.

Each of the switchable fiber optic directional couplers is arranged and functions generally in accordance with the teachings of U.S. Pat. No. 4,679,894 of Pavlath titled "Electrically Switched Fiber Optic Directional Coupler". As already described, each coupler consists of four ports, comprising two input ports and two output ports, and one electrical input. Each input port communicates with both output ports permitting two continuous segments of optical fiber to pass through the body of the coupler. In general, light received at the device through one optical fiber segment will be partially cross-coupled and output at the output port of the other fiber segment with the balance of the light remaining within the single mode fiber and thus being output at the output port of that fiber segment. A parameter K measures the ratio of cross-coupled power output to total power output on the two fiber segments. The electrical lead to the switchable coupler controls the coupling ratio K. Basically, the device may be electronically controlled so that, in theory, "normal" coupling takes place between the two fiber segments when a first (arbitrarily "on") control voltage value is applied and no coupling occurs when a second (arbitrarily "off") control voltage value is applied. In the latter instance, the light travels from the input port of a fiber optic segment to the output port of that segment essentially undiminished in intensity with the exception of a small amount of dissipative loss.

In actual practice, the coupling ratio does not go to zero under either condition. Rather, it will vary between normal and greatly reduced values as the control voltage is switched between the two voltages. Generally, one can expect to attain at least a 10:1 ratio between the "on" or normal value of the coupling ratio and the "off" or low value in a practical device. As will become apparent, the improvement in sensor array performance attained by the present invention is dependent upon this "on-off" ratio, a common method for characterizing switch performance. Furthermore, while ignored for purposes of this description, an actual switched coupler for sensor array applications will exhibit some dissipative loss, the lower the value of such term the better the performance of the system.

Figure 2:
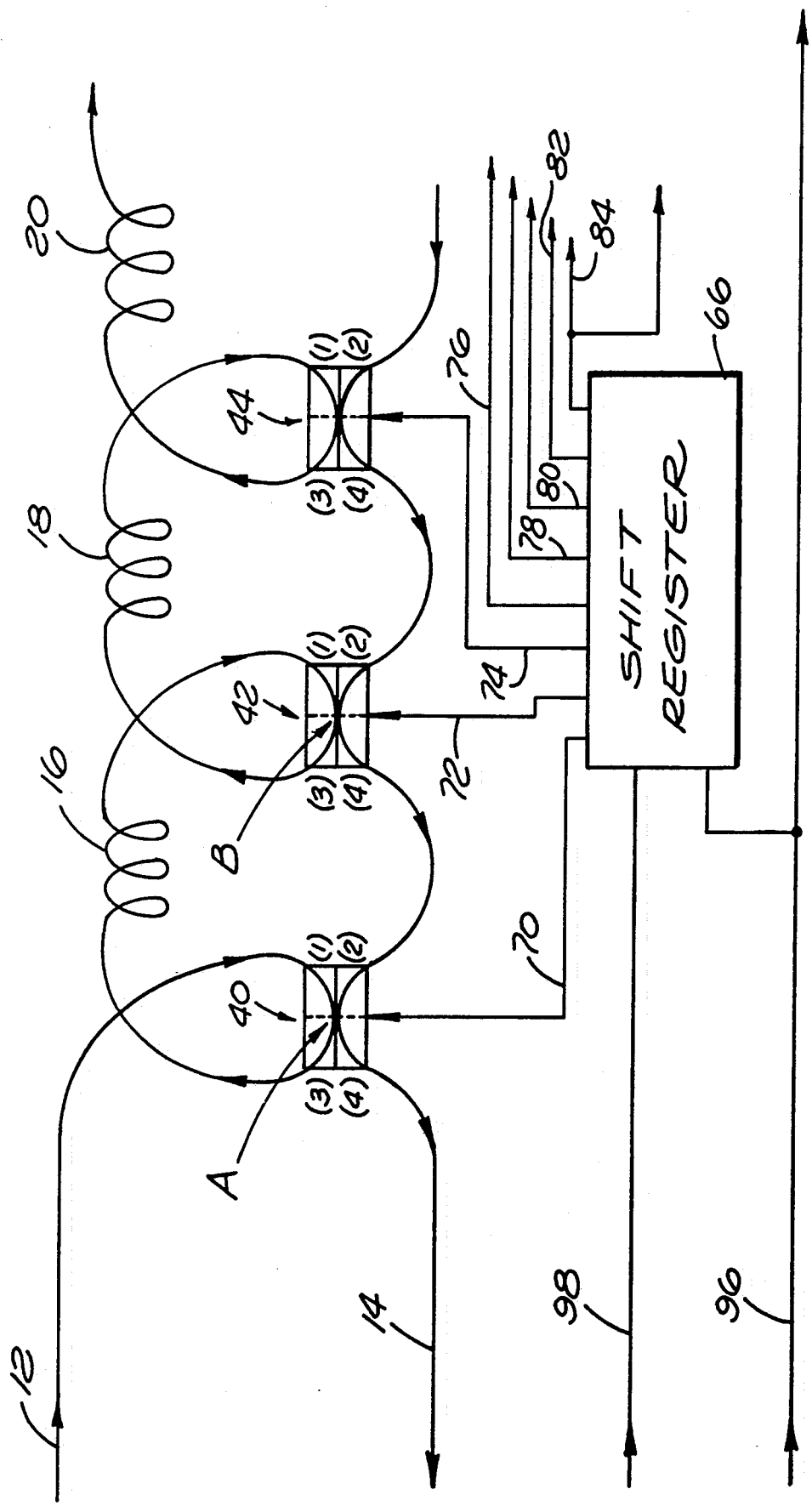
FIG. 2 is a schematic diagram of a portion of the fiber optic sensing array adjacent the input and output ends thereof for illustrating the operation of the invention.

FIG. 2 is a schematic diagram of a portion of the fiber optic sensor array of the invention adjacent the input and output ends of the optical fiber. In operation, a coherent light pulse of duration T seconds is input to the network through the input end 12. Prior to the arrival of the leading edge of this pulse at the coupler 40, a "one" or high voltage value is clocked into the data input of the leftmost shift register 66. As a result, a "one" appears on conductor 70 and a "zero" or low voltage value appears on all of the remaining parallel outputs 72 through 94. The couplers of the array are arbitrarily turned "on" by a "one" or high voltage value and are switched "off" by a "zero" or low voltage value. Therefore the coupler 40 is switched "on", and cross-coupling occurs between the segments of fiber of the sensor branch and the return bus that are threaded through the pairs of ports "1","3" and "2","4" thereof respectively. In accordance with this example, the only light pulse in the system is carried by the segment of the sensor branch [ports "1","3"] at this time.

Taking $t=0$ to be the instant at which the leading edge of the optical pulse arrives at coupler 40, and defining $\tau_1$ to be the time required for light to travel from one coupler to the next via the intermediate sensing coil, the optical pulse duration T is less than $\tau_1$. Referring to FIG. 2, delay $\tau_1$ occurs between points "A" and "B" for light propagating from the midpoint of the coupler 40 through the sense coil 16 and to the midpoint of the coupler 42.

Since the coupler 40 is switched "on" for times between zero and T, a small fraction of the coherent light pulse incident at input port "1" of the coupler 40 is cross-coupled onto the segment of the return bus at the "4" output port of that coupler and propagates to the output end 14 of the optical fiber. The balance of the power in the incident pulse is output on the sensor branch fiber segment at the output port "3" and propagates through sensor coil 16, its leading edge arriving at the coupler 42 after $\tau_1$ seconds.

Since $\tau_1$ exceeds T, a replica of the input light pulse (of reduced intensity) has been output to the return bus through the coupler 40. The balance of the optical power continues to propagate through the sense coil 16, arriving at the coupler 42 after $\tau_1$ seconds.

Just prior to the arrival of the optical pulse at the coupler 42, the data is clocked (clock frequency fc=$1/\tau_1$) one bit to the right in the shift register 66. (The data input is held low throughout; hence, only the initial "high" bit is clocked through the shift register 66 at each clock transition.) The clocked pulse causes the voltage on the conductor 70 to go low and that on the conductor 72 to go high as the remaining parallel outputs remain low. All of the switched couplers are now in their "off" states with the exception of the coupler 42.

For times exceeding $\tau_1$ and less than twice $\tau_1$, a fraction of the optical signal incident on the coupler 42 is coupled onto the return bus fiber. The balance continues to propagate through the sense coil 18 of the array. Defining $\tau_2$ as the delay that results for light propagating in the bus fiber between any two contiguous couplers, at time $t=\tau_1+\tau_2$, the portion of the optical pulse that was cross-coupled onto the return bus by the coupler 42 has reached input port "2" of the coupler 40. However, at this time, the voltage on the conductor 70 is "low" and no cross-coupling may occur between the sensor branch and return bus fiber segments. It should be noted that this feature of the invention reduces crosstalk and provides superior performance in comparison to prior art recursive fiber optic array designs. (In a typical sensor array, the length of fiber in the sense coils will be many times that of the bus fiber. Hence, $\tau_1$ is much greater than $\tau_2$. For example, the sense coil length may be 50 meters and a bus segment (between consecutive couplers) may be one meter or less. The corresponding delay times are 250 nanoseconds and 5 nanoseconds, respectively.)

As the optical pulse continues to propagate through the network, the shift registers are clocked every $\tau_1$ seconds. As a result, the single "high" bit that was initially entered follows the optical pulse down the network, just preceding the arrival of the optical pulse at each of the switched directional couplers. Since this "high" bit turns the switched coupler "on", a portion of the coherent light pulse is tapped into the return bus fiber after propagating in turn through each consecutive sense coil. Accordingly, a train of pulses appears on the return bus fiber, the first of which propagated up to the coupler 40, the second up to the coupler 42 through the sense coil 16, the third up to the coupler 44 through the sense coils 16 and 18 and so forth. The relative time delay or phase between each consecutive pulse can be measured by comparing the total integrated phase between consecutive pulses in a differential manner. Hence, the instantaneous state of the desired measurand may be determined.

Figure 3:
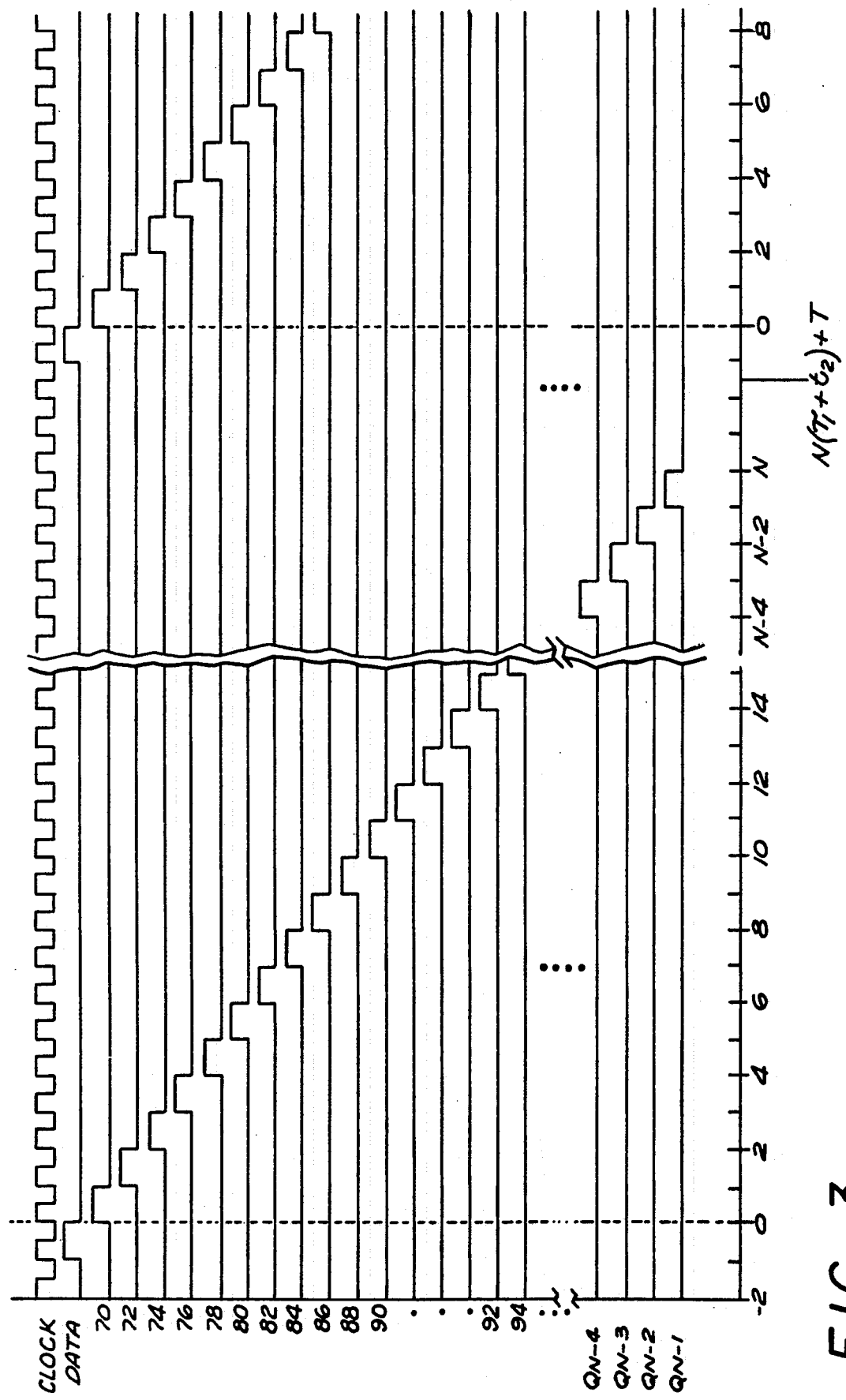
FIG. 3 is a series of waveforms comprising a timing diagram for illustrating the signals that control the operation of the fiber optic array of the invention.

FIG. 3 is a series of waveforms comprising a timing diagram for illustrating the operation of the fiber optic array of the invention. The relationships between the clock, data input and parallel outputs (switch control voltages) are indicated in this figure. Ideal switch coupler performance is assumed (i.e. zero cross-coupling when switch control voltage is "low"). Clock frequency is defined by $1/\tau_1$. The start of the process is synchronized to the arrival of the leading edge of the optical pulse at the coupler 40.

After the optical pulse reaches the rightmost sense coil, (note that the array may be extended beyond the number of sense coils, couplers and control registers shown in FIG. 1) and sufficient time is allowed for all of the sampling optical pulses to pass coupler 40 of the input fiber bus, the entire process described above is repeated. In effect, each sensor is sampled periodically.

The status of the clock, data and parallel outputs are shown as a function of time, measured in units of $\tau_1$. At the end of a time period defined by $N(\tau_1+\tau_2)+T$, all of the optical pulses have reached the return bus fiber, just to the left of the output port "4" of the coupler 40. A second interrogation pulse can be launched such that its leading edge arrives at port 1 of the coupler 40 at time $t=N(\tau_1+\tau_2)+T$. Hence, the maximum sampling rate for this array is given by the reciprocal of $N(\tau_1+\tau_2)+T$.

Figure 4:
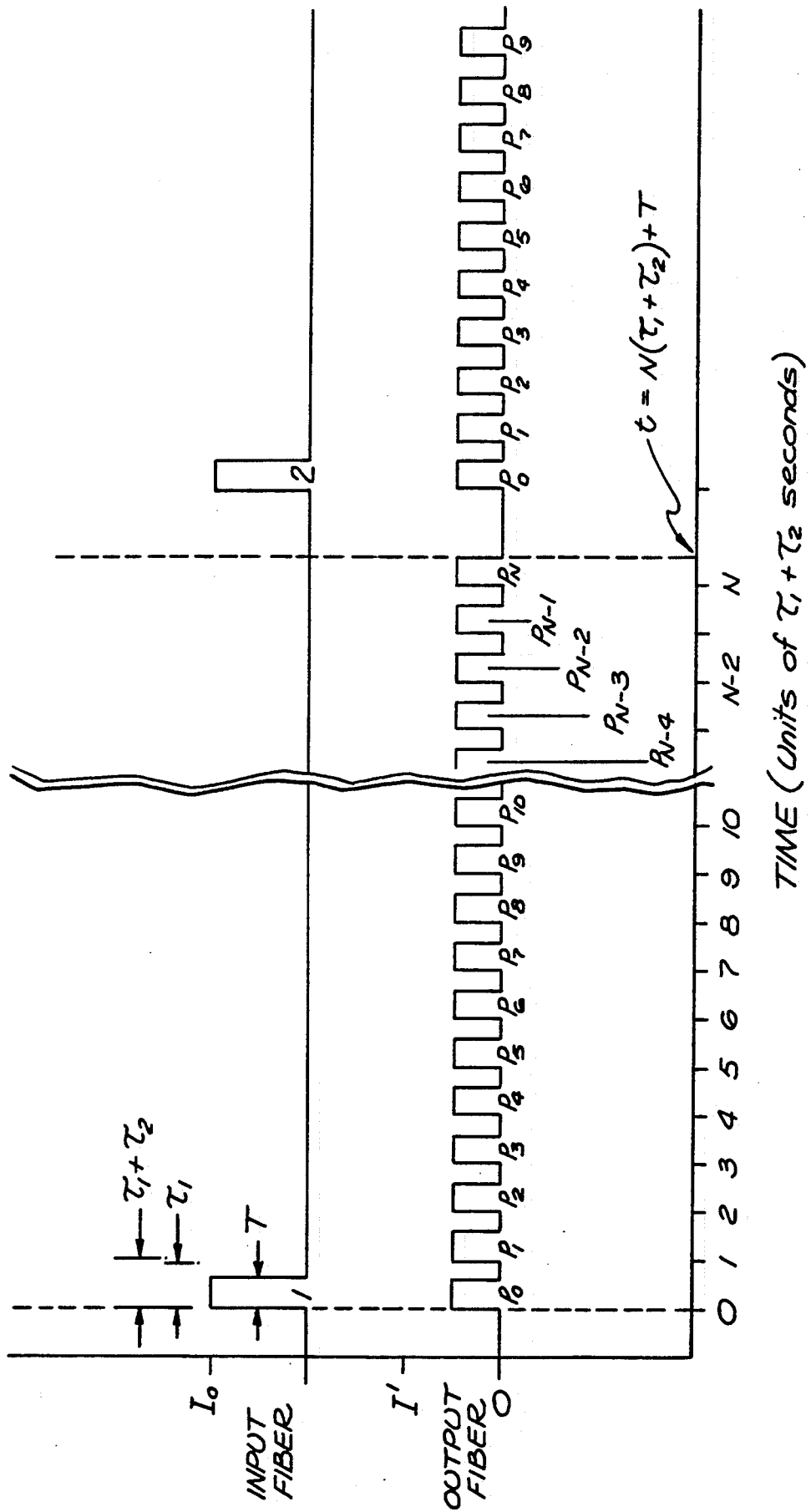
FIG. 4 is a timing diagram comprising a pair of waveforms for illustrating the relationship between the input and output of the fiber optic array.

FIG. 4 is a timing diagram comprising a pair of waveforms for illustrating the relationship between the optical input and output of the array of the invention. $N=1$ pulses are observed at the output end of the fiber for each optical pulse input to the network, N representing the number of sense coils. (Note that the units on the time axis for this figure are $\tau_1+\tau_2$ as contrasted to $\tau_1$ for the electronic timing diagram of FIG. 3. This reflects the fact that the optical pulses must traverse the return bus fiber segments prior to arriving at the network output and does not present any limitations or difficulty whatsoever to the operation of the array. However, in order to operate the array in a simple manner, the optical pulse width T must be less than $\tau_1$ rather than less than $\tau_1+\tau_2$. This is readily achieved since $\tau_1$ greatly exceeds $\tau_2$.)

Figure 5:
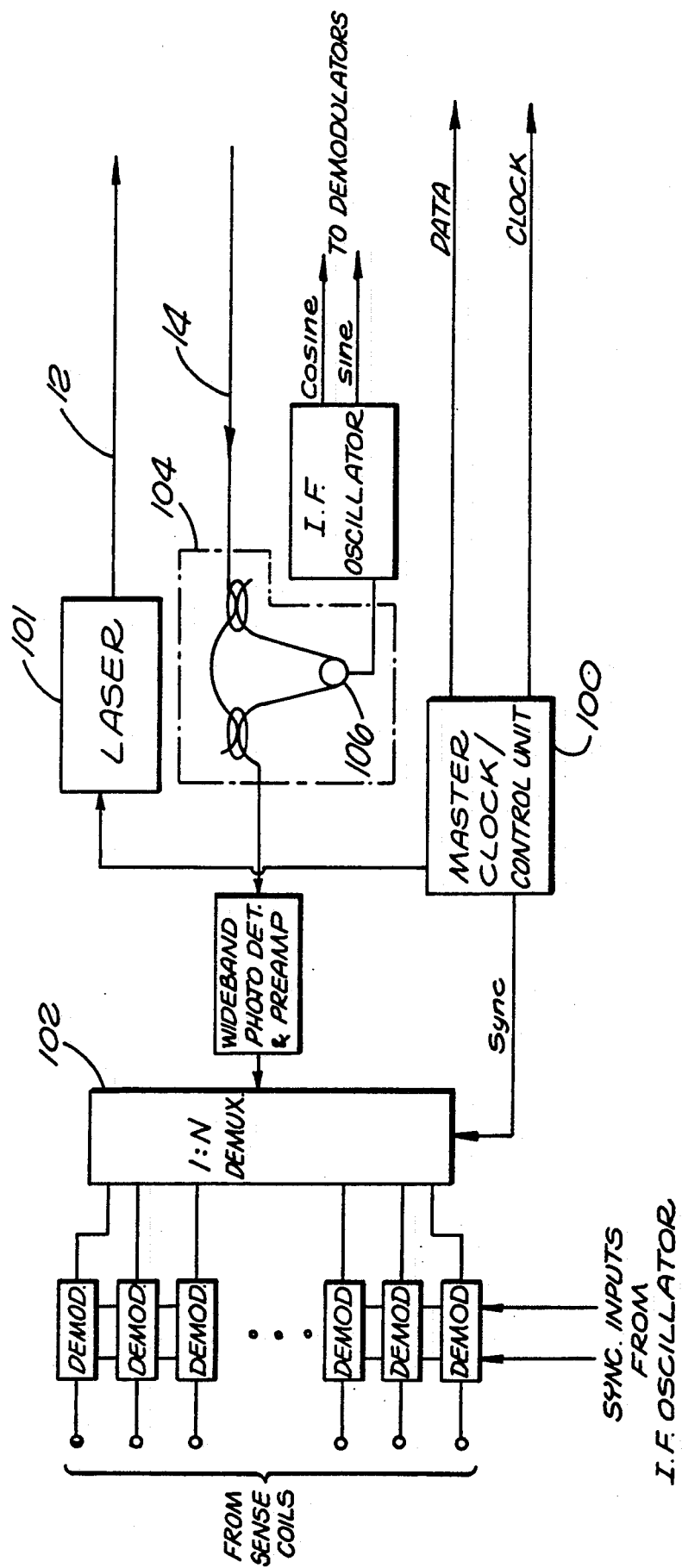
FIG. 5 is a schematic diagram of a remote electrooptic system for launching coherent pulses of light into the array and for processing the output pulse train.

FIG. 5 is a schematic diagram of a remote electrooptic system for launching coherent pulses of light into the array 10 and for processing the output pulse train. A combined master clock/control unit 100 determines the optical pulse width and pulse repetition rate (i.e. sampling rate) and applies the required gate input to a time-gated laser source 101. Furthermore the unit 100 controls the static delays of the clock and data pulses relative to the pulse controlling the optical gate and provides the required delayed "sync" signal to a 1:N demultiplexer 102.

A Mach-Zehnder interferometer 104 accepts the output pulse train from the return bus fiber 14. The interferometer 104 acts as an optical signal processor that overlaps in time and space consecutive optical pulses (i.e. the pulses $P_0$ and $P_1$, $P_1$ and $P_2$, and so forth as shown in FIG. 4). The longer arm of the interferometer 104 includes an optical phase modulator 106 that impresses a high frequency, high level phase modulation onto a delayed replica of the pulse train prior to overlapping it with the undelayed replica at the output, the latter having traversed the short arm of the interferometer. As is well known in the art, the high level phase modulation simplifies the demodulation of the desired signal. As shown in FIG. 5, the arrangement also includes apparatus for photodetection, demultiplexing and demodulation. The operation of such apparatus within the present invention will be apparent to those skilled in the art.

Thus, as can be seen, the present invention provides an efficient fiber optic sensor array architecture that offers improved performance over prior art designs. By utilizing the teachings of this invention, one may realize the inherent advantages offered by fiber optic architectures over their electronic counterparts without the problems of crosstalk and optical power loss that have characterized prior fiber optic design efforts.

While this invention has been described with reference to its presently preferred embodiment, it is not limited thereto. Rather, the scope of this invention is limited only insofar as defined by the following set of claims and includes all equivalents thereof.

What is claimed is:

1. A fiber optic sensing array comprising, in combination:
   (a) a continuous optical fiber, said fiber being arranged into a sensor branch and a return bus;
   (b) said sensor branch including a plurality of distinct fiber sensing coils;
   (c) a plurality of switchable directional couplers, each of said couplers including a pair of input ports and a pair of output ports arranged so that communication is provided between said bus and said sensor branch;
   (d) said sensor branch and said return bus being arranged so that a fiber segment of said sensor branch passes from an input port to an output port of each of said couplers and a fiber segment of said return bus passes from an input port to an output port of each of said couplers;
   (e) means for selectively switching each of said couplers between an "on" state and an "off" state whereby, in said "off" state, light is not coupled between said sensor branch and said return bus segments of said optical fiber;
   (f) means for applying a coherent optical pulse to said optical fiber;
   (g) means for applying predetermined electrical signals to said couplers so that each coupler is switched to an "on" state prior to arrival of said pulse and switched to said "off" state after transit of said pulse therethrough; and
   (h) means engaged to the termination of said optical fiber adjacent said return bus for receiving the optical output of said array.

2. A fiber optic sensing array as defined in claim 1 wherein:
   (a) said sensor branch includes a plurality of loops each of said loops being adjacent a sense coil; and
   (b) each of said loops includes a fiber segment of said sensor branch that passes from an input port to an output port of a directional coupler.

3. A fiber optic sensing array as defined in claim 2 wherein the ends of said optical fiber are located at an end of said array.

4. A fiber optic sensing array as defined in claim 3 wherein said means for selectively switching each of said couplers further includes:
   (a) at least one shift register; and
   (b) each of said directional couplers is in communication with a stage of said at least one shift register.

5. A fiber optic sensing array as defined in claim 4 wherein said means for receiving the optical output of said array includes a mach-Zehnder interferometer.

6. A fiber optic sensing array is defined in claim 5 wherein said shift registers are serial in-parallel out shift registers.

7. A fiber optic sensing array as defined in claim 6 wherein each of said sense coils is an acoustic pressure sensor.

* * * * *